United States Patent
Ahrens

(10) Patent No.: US 9,187,619 B2
(45) Date of Patent: Nov. 17, 2015

(54) DERIVATIVES OF SULPHOSUCCINIC ACID AS A DISPERSING AGENT IN AQUEOUS BINDER-FREE PIGMENT PREPARATIONS

(71) Applicant: Hendrik Ahrens, Kriftel (DE)

(72) Inventor: Hendrik Ahrens, Kriftel (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 14/429,253

(22) PCT Filed: Aug. 20, 2013

(86) PCT No.: PCT/EP2013/002503
§ 371 (c)(1),
(2) Date: Mar. 18, 2015

(87) PCT Pub. No.: WO2014/044345
PCT Pub. Date: Mar. 27, 2014

(65) Prior Publication Data
US 2015/0247023 A1 Sep. 3, 2015

(30) Foreign Application Priority Data

Sep. 19, 2012 (DE) .......................... 10 2012 018 544

(51) Int. Cl.
| | |
|---|---|
| C09D 11/03 | (2014.01) |
| C09D 11/033 | (2014.01) |
| C09B 67/00 | (2006.01) |
| C09D 17/00 | (2006.01) |
| C09D 4/00 | (2006.01) |
| C09D 5/00 | (2006.01) |
| C08K 5/41 | (2006.01) |
| C09D 11/02 | (2014.01) |
| C09D 7/12 | (2006.01) |

(52) U.S. Cl.
CPC ............... *C08K 5/41* (2013.01); *C09D 7/1233* (2013.01); *C09D 11/02* (2013.01)

(58) Field of Classification Search
CPC .... C09D 11/03; C09D 11/033; C09D 17/001; C09D 17/003; C09D 17/004; C09D 17/007; C09D 17/008; C09D 5/00; C09D 4/00; C09B 67/0066
USPC .............. 106/31.75, 31.86, 31.87, 499, 287.3
See application file for complete search history.

(56) References Cited

U.S. PATENT DOCUMENTS

| | | | | |
|---|---|---|---|---|
| 4,156,616 A | * | 5/1979 | Dietz et al. ..................... | 106/499 |
| 4,169,737 A | * | 10/1979 | Burke et al. ................... | 523/216 |
| 5,279,654 A | * | 1/1994 | Keirs et al. ..................... | 106/499 |
| 5,420,315 A | * | 5/1995 | Uhrig et al. ..................... | 554/96 |
| 7,462,660 B2 | * | 12/2008 | Poellmann et al. ............. | 524/59 |
| 7,811,376 B2 | * | 10/2010 | Fechner et al. ............. | 106/31.86 |
| 8,968,462 B2 | * | 3/2015 | Ahrens .......................... | 106/499 |
| 2010/0216960 A1 | * | 8/2010 | Ahrens et al. ................. | 526/278 |
| 2010/0222500 A1 | * | 9/2010 | Ahrens et al. ................. | 106/493 |
| 2010/0300327 A1 | * | 12/2010 | Sasada et al. ................. | 106/400 |

FOREIGN PATENT DOCUMENTS

| | | | |
|---|---|---|---|
| EP | 0403718 A2 | * | 12/1990 |
| WO | WO 2014/000842 A1 | * | 1/2014 |
| WO | WO 2015/051866 A1 | * | 4/2015 |

* cited by examiner

*Primary Examiner* — Helene Klemanski
(74) *Attorney, Agent, or Firm* — Tod A. Waldrop

(57) ABSTRACT

The invention relates to aqueous binder-free pigment preparations containing (A) 1.0 to 75.0 wt. % of at least one organic or inorganic white or colored pigment or a mixture of different organic and inorganic white or colored pigments, (B) 0.01 to 8.0 wt. % of at least one compound of formula (I), R being a saturated or unsaturated, linear or branched, aliphatic or alicyclic hydrocarbon group with 6 to 18 carbon atoms; n is a whole number from 0 to 10; A is an oxygen atom or a bi-functional group of formula (II), B is a hydrogen atom or a group of formula (III), bonding thereof occurring by means of the valency characterized by *, X and Y are selected from sulphonic acid groups in acidic form or their sodium, potassium and ammonium salt, and hydrogen atoms, where if X represents a sulphonic acid group or its salt then Y is a hydrogen atom, and vice versa if X represents a hydrogen atom then Y is a sulphonic acid group or its salt, and M represents a hydrogen atom or a sodium, potassium or ammonium ion, and if B is a functional group of formula (III), n stands for 0 and M stands for a sodium atom, (C) 0.01 to 12.0 wt. % of a non-ionic surfactant, and (G) is water.

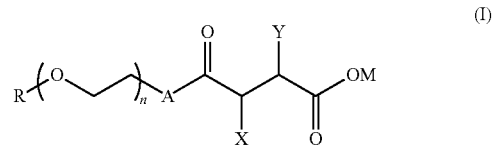

(I)

(II)

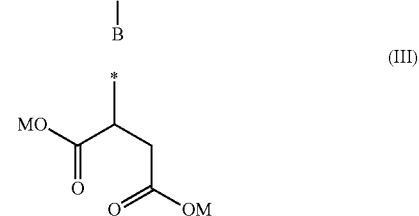

(III)

18 Claims, No Drawings

DERIVATIVES OF SULPHOSUCCINIC ACID AS A DISPERSING AGENT IN AQUEOUS BINDER-FREE PIGMENT PREPARATIONS

The subject matter of the present invention are aqueous, binder-free pigment preparations which comprise derivatives of sulfosuccinic acid as dispersants, and also their use for the coloring of macromolecular materials of all kinds, such as, for example, fiber materials, dying of paper in the mass, coating materials, paints, inks, and the use thereof for printing two-dimensional sheetlike structures such as, for example, paper, cardboard packaging, plastic, textiles, and leather.

For the coloring of macromolecular materials, more particularly of inks and paints, aqueous, binder-free pigment preparations are produced, with organic or inorganic pigments. These pigment preparations are employed as tinting pastes in home improvement stores and decorating trade outlets, and, by means of metering and tinting units, are added to aqueous and solventborne paints and varnishes in order to produce shades in line with customer requirements. Tinting pastes customarily comprise pigment concentrations in a broad concentration range from 1 to 75 mass %.

Although according to the prior art a large number of compounds have been proposed as suitable wetting agents and dispersants, the art continually lacks effective dispersants for pigment dispersions that satisfy the requirements in terms of sedimentation stability, rheological behavior, pigment color yield, and low human and environmental toxicology. Furthermore, awarding guidelines for environmental credentials limit the use of known wetting and dispersing assistants, and consequently the skilled person is continually on the hunt for new dispersants and combinations in order to produce liquid, stable, aqueous pigment preparations.

The present invention was based on the object of producing stable and fluid, alkylphenol-free aqueous pigment preparations which exhibit no sedimentation of the pigments used over a prolonged time period, and with which aqueous and solventborne paints, varnishes, and stains can equally be colored. In the tinting of aqueous varnishes and paints, more particularly emulsion paints, silicate dispersion paints, and aqueous silicone resin paints, the pigment preparations of the invention ought not to exhibit any rubout problems.

Moreover, the aqueous pigment preparations are also to be compatible with solventborne paints, are to be amenable to homogeneous dispersion in the paint by mixing, stirring, or shaking, and to produce an even, uniform image when applied by brush or roller to surfaces. Also serving for the compatibility of the aqueous pigment preparations is the rubout test, which is carried out in the manner described in U.S. Pat. No. 3,840,383.

A further object of the invention was to provide aqueous pigment preparations featuring low human toxicological potential and low environmental hazard. Volatile organic compounds having a boiling point of <250° C. (VOC contents) are not explicitly to be added to the aqueous pigment preparations, and are to be present only in small amounts in the form of unreacted raw materials from synthesis, or as secondary reaction products.

Surprisingly it has been found that pigment preparations which comprise sulfosuccinic acid derivatives of the formula (I) in combination with nonionic surfactants comply with this object.

The invention accordingly provides aqueous, binder-free pigment preparations comprising (A) 1.0 to 75.0 wt % of at least one organic or inorganic white or chromatic pigment or a mixture of different organic and inorganic white or chromatic pigments, (B) 0.01 to 8.0 wt % of at least one compound of the formula (I),

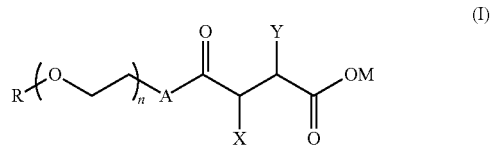

in which

R is a saturated or unsaturated, linear or branched, aliphatic or alicyclic hydrocarbon radical having 6 to 18 carbon atoms, n is an integer from 0 to 10, A is an oxygen atom or a difunctional group of the formula (II)

B is a hydrogen atom or a group of the formula (III),

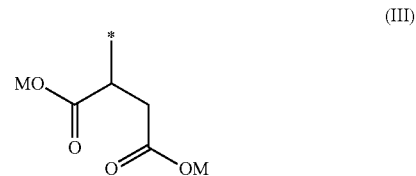

whose bonding is via the valence marked with *,

X and Y are selected from sulfonic acid groups in acidic form or their sodium, potassium, and ammonium salt and from hydrogen atoms; if X is a sulfonic acid group or salt thereof, Y is a hydrogen atom, and, conversely, if X is a hydrogen atom, Y is a sulfonic acid group or salt thereof, and M is a hydrogen atom or a sodium, potassium, or ammonium ion, and, if B is a functional group of the formula (III), n is 0 and M is a sodium atom, (C) 0.01 to 12.0 wt % of a nonionic surfactant, and (G) water.

The pigment preparation of the invention may further comprise optionally one or more of the following constituents:

(D) 0-8.0 wt % of clay mineral thickeners based on natural or alkali-activated montmorillonite phyllosilicate minerals, (E) 0-20.0 wt % of inorganic fillers, and (F) 0 to 30 wt % of further auxiliaries customary for the production of aqueous pigment preparations, such as additional wetting agents, humectants, solvents, defoamers, rheological additives, preservatives, buffer substances, and pH regulators.

The pigment preparations of the invention are shear-resistant, dryout-resistant, storage-stable, foam little or not at all on application, and possess an outstanding rheology.

Component (A) of the pigment preparations of the invention is preferably a finely divided, organic or inorganic white or chromatic pigment or a mixture of different pigments.

An exemplary selection of particularly preferred organic pigments includes carbon black pigments, such as gas blacks or furnace blacks, for example; monoazo and disazo pigments, more particularly the Color Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34, or Pigment Brown 41; β-naphthol and naphthol AS pigments, more particularly the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 254, Pigment Red 256, Pigment Orange 5, Pigment Orange 38, or Pigment Brown 1; laked azo and metal complex pigments, more particularly the Colour Index pigments Pigment Red 48:2, Pigment Red 48:3, Pigment Red 48:4, Pigment Red 57:1, Pigment Red 257, Pigment Orange 68, or Pigment Orange 70; benzimidazoline pigments, more particularly the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72, or Pigment Brown 25; isoindolinone and isoindoline pigments, more particularly the Colour Index pigments Pigment Yellow 139 or Pigment Yellow 173; phthalocyanine pigments, more particularly the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7, or Pigment Green 36; anthanthrone, anthraquinone, quinacridone, dioxazine, indanthrone, perylene, perinone, and thioindigo pigments, more particularly the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23, or Pigment Orange 43; triarylcarbonium pigments, more particularly the Colour Index pigments Pigment Red 169, Pigment Blue 56, or Pigment Blue 61.

Suitable inorganic pigments are, for example, titanium dioxides, zinc sulfides, zinc oxides, iron oxides, magnetites, manganese iron oxides, chromium oxides, ultramarine, nickel or chromium antimony titanium oxides, manganese titanium rutiles, cobalt oxides, mixed oxides of cobalt and aluminum, rutile mixed phase pigments, sulfides of the rare earths, spinels of cobalt with nickel and zinc, spinets based on iron and chromium with copper zinc and manganese, bismuth vanadates, and extender pigments. Used in particular are the Color Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33, and Pigment White 6. Used preferably in many cases are also mixtures of inorganic pigments. Mixtures of organic with inorganic pigments are likewise used in many cases.

Component (B) of the pigment preparations of the invention is a derivative of sulfosuccinic acid. (B) in one embodiment is a sulfosuccinic monoester of the formula (IV),

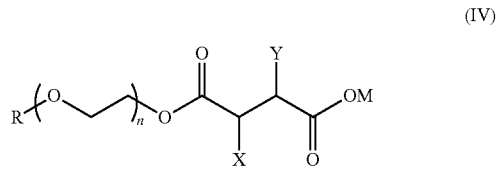

(IV)

in which
R is a saturated or unsaturated, linear or branched, aliphatic or alicyclic hydrocarbon radical having 6 to 18 carbon atoms,
n is an integer from 0 to 10,
X and Y are a sulfonic acid group —$SO_3M$, and, if X is sulfonic acid group, Y is a hydrogen atom, and, conversely, if X is a hydrogen atom, Y is a sulfonic acid group, and
M is a hydrogen atom or a sodium, potassium, or ammonium ion;

(B) in another embodiment is an alkyl sulfosuccinamate of the formula (V),

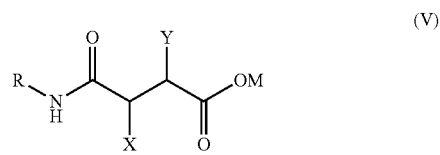

(V)

in which
R is a saturated or unsaturated, linear or branched, aliphatic hydrocarbon radical having 6 to 18 carbon atoms,
X and Y are a sulfonic acid group —$SO_3M$, and, if X is a sulfonic acid group, Y is a hydrogen atom, and, conversely, if X is a hydrogen atom, Y is a sulfonic acid group, and
M is a hydrogen atom or a sodium, potassium, or ammonium ion.

In one particular embodiment, the derivative of sulfosuccinic acid is an amide of the formula (VI),

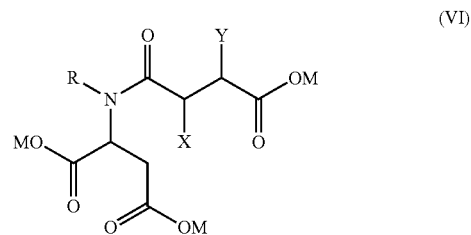

(VI)

in which
R is a saturated or unsaturated, linear or branched, aliphatic hydrocarbon radical having 6 to 18 carbon atoms,
X and Y are a sulfonic acid group —$SO_3M$, and, if X is a sulfonic acid group, Y is a hydrogen atom, and, conversely, if X is a hydrogen atom, Y is a sulfonic acid group, and
M is a hydrogen atom or a sodium, potassium, or ammonium ion.

Component (C) of the pigment preparations of the invention is a nonionic surfactant. It is preferably selected from the group of the fatty alcohol ethoxylates, di- and tristyrylphenol ethoxylates, fatty acid ethoxylates, esters of polyethylene glycols with fatty acids, fatty acid alkanolamide ethoxylates, EO/PO block copolymers, fatty alcohol-EO/PO adducts, and also endgroup-capped fatty alcohol ethoxylates. Mixed alkoxylates may be alkoxylated both randomly and in blocks, unless otherwise described below.

Alcohols suitable for preparing the fatty alcohol ethoxylates are fatty alcohols of natural origin having 8 to 22 carbon atoms, such as octyl alcohol, decyl alcohol, lauryl alcohol, myristyl alcohol, cetyl alcohol, palmitol, stearyl alcohol, eicosanol, behenyl alcohol, oleyl alcohol, linolyl alcohol, linolenol, ricinoleyl alcohol, or mixtures of $C_8$ to $C_{22}$ chain fractions, such as coconut fatty alcohol and palm kernel oil alcohol, for example. Additionally suitable are synthetic primary alcohols such as iso-$C_{13}$ oxo-process alcohols, $C_{13}/C_{15}$ oxo-process alcohols, mixtures of linear, singly branched or multiply branched oxo-process alcohols having an average C chain length of 10 to 15 carbon atoms, Ziegler alcohols having 8 to 22 carbon atoms, and Guerbet alcohols having 10, 12, 14, 16, or 18 carbon atoms, and linear and branched, secondary alkanols having 6 to 22 carbon atoms. The alcohols used may be saturated and unsaturated. The fatty alcohols are reacted in a conventional way by means of alkaline or acidic catalysts with ethylene oxide. The average degree of ethoxylation of the alcohols is 1 to 100 mol of ethylene oxide, preferably 3 to 50, and more preferably 5 to 30 mol of ethylene oxide.

In a similar way, di- and tristyrylphenol ethoxylates are also prepared from di- and tristyrylphenol, it being possible for the alcohols to take the form of mixtures of mono-, di, and tristyrylphenol and for the average degree of substitution to be from 2 to 3 1-phenylethyl units.

Suitable fatty acid ethoxylates are reaction products of ethylene oxide with natural and synthetic fatty acids that have been reacted with 1 to 100 mol of ethylene oxide, preferably 3 to 50, and more preferably 5 to 30 mol of ethylene oxide.

Further fatty acid derivatives suitable for the reaction with ethylene oxide are fatty acid sorbitan esters, castor oil, fatty acid glycerol esters, and fatty acid polyglycerol esters.

Further suitable nonionic surfactants are products of esterification of polyethylene glycol having an average molecular weight of 200 to 8000 g/mol with fatty acids.

One particularly preferred group of nonionic surfactants for component (C) are ethoxylation products of fatty acid alkanolamides. Particularly preferred are ethoxylated fatty acid ethanolamides (formula VII).

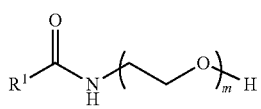

(VII)

Ethoxylated fatty acid ethanolamides are prepared preferably by reaction of fatty acids with ethanolamine to give the fatty acid ethanolamide, and subsequent addition reaction of ethylene oxide by means of alkaline catalysts such as sodium methoxide or potassium methoxide. $R^1$ is preferably an alkyl or alkenyl group having 11 to 19 carbon atoms, and more than one double bond may also be present. m is a number from 1 to 50, preferably 1 to 30, and preferably at least 2, more particularly at least 3. Starting from the fatty acid ethanolamide, ethylene oxide is added preferably onto the terminal hydroxyl group. The addition of ethylene oxide onto the nitrogen of the acid amide group takes place to a minor extent in a secondary reaction, and so to a minor extent there are also 2 polyethylene glycol ether radicals bonded on the nitrogen. Suitable fatty acids for the preparation of the fatty acid ethanolamides are capric acid, lauric acid, myristic acid, palmitic acids, margaric acid, stearic acid, arachidic acid, behenic acid, palmitoleic acid, oleic acid, and naturally occurring mixtures such as palm kernel oil fatty acid, rapeseed oil fatty acid, sunflower oil fatty acid, soyabean oil fatty acid, or resin acids such as tall oil fatty acid. The fatty acids used as raw material may be saturated and unsaturated.

Further nonionic surfactants suitable as component (C) are ethylene oxide/propylene oxide block copolymers having an average molecular weight of preferably 1000 to 10 000 g/mol and an ethylene oxide content of preferably 10 to 99 wt % in the molecule. The ethylene oxide/propylene oxide block copolymers are prepared by addition reaction of ethylene oxide onto polypropylene glycol, or by addition reaction of propylene oxide to polyethylene glycol.

Further nonionic surfactants suitable as component (C) are fatty alcohol-EO/PO adducts and end group-capped fatty alcohol ethoxylates. Suitable fatty alcohol-EO/PO adducts are prepared by blockwise addition reaction of ethylene oxide and propylene oxide onto fatty alcohols. The fatty alcohols are either reacted first with ethylene oxide and then with propylene oxide, or, in the reverse order, adducted first with propylene oxide and then with ethylene oxide.

Suitable end group-capped fatty alcohol ethoxylates are reaction products of fatty alcohol ethoxylates with alkyl halides, as for example methyl chloride, ethyl chloride, and n-butyl chloride.

Component (D) is a clay mineral thickener based on natural or alkali-activated montmorillonite phyllosilicate minerals. Montmorillonite is the key constituent of bentonite and possesses a high ion exchange capacity. On addition of water, the mineral expands by a multiple of the original size, thereby increasing the viscosity of the aqueous dispersion. Montmorillonite as a clay mineral thickener can be added to the pigment preparation of the invention in order to retard or prevent the sedimentation of organic and inorganic pigments and fillers, and the syneresis, in other words the formation of a second phase with a different composition.

Component (E) is an inorganic filler, which may be added to the pigment preparations of the invention in order to raise the density and modify the flow behavior. In the case of volumetric metering and low pigment concentration or lightweight organic pigments, it may be possible that the pigment preparation is difficult to feed into the metering equipment, since the gravitational force is not sufficient to empty the liquid pigment preparation into the paint can. In other cases, at low pigment concentrations, the viscosity of the pigment preparations is too low, leading to dripping. In both cases, colorless inorganic fillers may be added to the pigment preparations of the invention, in order to raise the density of the pigment preparation and to improve the flow behavior. Suitable fillers are calcium carbonates such as naturally occurring chalk and precipitated calcium carbonate, dolomite, natural silicon dioxide (finely ground quartz), fumed and precipitated silicas, kieselguhr, aluminum oxides, aluminum hydroxides, talc, kaolin, mica (potassium aluminum silicate hydrate), barium sulfates such as naturally occurring heavy spars, and precipitated blanc fixe.

Components (F) are further auxiliaries customary for the production of aqueous pigment preparations, such as additional wetting agents, humectants, solvents, defoamers, rheological additives, preservatives, buffer substances, and pH regulators.

Additional wetting agents may be wetting agents based on polysiloxane ethers, as for example a methoxypolyethoxypropyltrisiloxane, alkynediol ethoxylates, and fluorosurfactants.

Suitable humectants and solvents are preferably glycol ethers, by which are meant here compounds having ethoxy and/or propoxy groups and having average molar masses of between 200 and 20 000 g/mol, more particularly polyethylene glycol ethers or polypropylene glycol ethers having an average molar mass of between 200 and 20 000 g/mol, mono-, di-, or triethylene glycol, mono-, di-, or tripropylene glycol, methyl-, ethyl-, propyl-, butyl-, or higher alkyl-polyalkylene glycol ethers having 1, 2, 3, or more ethylene glycol or propylene glycol units such as, for example, methoxypropanol, dipropylene glycol monomethyl ether, tripropylene glycol monomethyl ether, ethylene glycol monobutyl ether, diethylene glycol monobutyl ether, butylpolyethylene glycol ether, propylpolyethylene glycol ether, ethylpolyethylene glycol ether, methylpolyethylene glycol ether, dimethylpolyethylene glycol ether, dimethylpolypropylene glycol ether, and glycerol ethoxylates having a molecular weight of 200 to 20 000 g/mol, pentaerythritol alkoxylates having a molecular weight of 200 to 20 000 g/mol, or further ethoxylation and alkoxylation products, and random or block copolymers prepared by addition of ethylene oxide and/or propylene oxides onto monohydric and higher polyhydric alcohols, with a molecular weight of 200 to 20 000 g/mol.

Figures for molecular weights of polymers are always based on their number-average molecular weight, unless indicated otherwise in any particular case. Molecular weights can be determined by GPC against polyethylene glycol as standard.

Further suitable auxiliaries in the aqueous pigment preparations of the invention are preferably water-soluble organic or hydrotropic substances, which optionally also serve as solvents. Particularly suitable, for example, are formamide, urea, tetramethylurea, c-caprolactam, glycerol, diglycerol, polyglycerol, N-methylpyrrolidone, 1,3-diethyl-2-imidazolidinone, thiodiglycol, sodium benzenesulfonate, sodium xylenesulfonate, sodium toluenesulfonate, sodium cumenesulfonate, sodium dodecylsulfonate, sodium benzoate, sodium salicylate, sodium butyl monoglycol sulfate.

Suitable defoamers are preferably mineral oil defoamers and emulsions thereof, silicone oil defoamers and silicone oil emulsions, polyalkylene glycols, polyalkylene glycol fatty acid esters, fatty acids, higher alcohols, phosphoric esters, hydrophobically modified silica, aluminum tristearate, polyethylene waxes, and amide waxes.

Suitable further rheological additives as agents for regulating the viscosity are, for example, starch derivatives and cellulose derivatives, and hydrophobically modified ethoxylated urethanes (HEUR) thickeners, alkali-swellable acrylate thickeners, hydrophobically modified acrylate thickeners, polymers of acrylamidomethylpropanesulfonic acid, or fumed silica.

In-can preservatives are added to stabilize the aqueous pigment preparations and to prevent the uncontrolled multiplication of bacteria, algae, and fungi. Suitable biocides are formaldehyde, formaldehyde donor components, methylisothiazolinone, chloromethylisothiazolinone, benzisothiazolinone, bronopol, dibromodicyanobutane, and silver chloride-coated titanium dioxide.

Buffer substances and pH regulators employed are preferably organic or inorganic bases and acids. Preferred organic bases are amines, such as ethanolamine, diethanolamine, triethanolamine, N,N-dimethylethanolamine, diisopropylamine, 2-amino-2-methyl-1-propanol, or dimethylaminomethylpropanol, for example. Preferred inorganic bases are sodium hydroxide, potassium hydroxide, and lithium hydroxide, or ammonia.

Water used in preparing the aqueous pigment preparations of the invention, component (G), is employed preferably in the form of distilled or demineralized water. Drinking water (mains water) as well, and/or water of natural origin, may be used. Water is present in the aqueous pigment preparation of the invention at preferably 10 to 75 wt %, more particularly ad 100 wt %.

The aqueous pigment preparations of the invention preferably have a viscosity of 10 to 10 000 mPas, more preferably 30 to 5000 mPas, and very preferably 50 to 3000 mPas, measured with a cone/plate viscometer at a shear rate of $\frac{1}{60}$ $sec^{-1}$, e.g., with a Haake Viscometer 550.

The aqueous pigment preparations of the invention are miscible with water in any proportion, and a plurality of different preparations can also be mixed with water. The preparations are notable, relative to conventional pigment preparations, for outstanding stability in storage, and good rheological properties.

The present invention also provides a method for producing the pigment preparations of the invention, by dispersing component (A) in the form of powder or granules in the presence of water (G) and also of components (B), (C), and optionally (D), (E), and (F) in an intrinsically conventional way, then optionally admixing further water (G), and adjusting the resultant aqueous pigment dispersion with water to the desired concentration. The liquid components (B), (C), (G), and optionally (F) are preferably mixed and homogenized, then the solid components (A), (D), and (E), in powder, granulated, or flake form, are stirred into the mixture introduced initially, with the pigment and optionally the filler being pasted and subjected to preliminary dispersing. Depending on the grain harshness of the pigments used, this is followed by fine dispersion or fine distribution with the aid of a milling or dispersing assembly, optionally with cooling. For this purpose, use may be made of stirring mechanisms, dissolvers (sawtooth stirrers), rotor-stator mills, ball mills, agitated ball mills such as sand mills and bead mills, high-speed mixers, kneading apparatus, roll mills, or high-performance bead mills. The fine dispersing and/or milling of the pigments takes place until the desired particle size distribution is reached, and may be carried out at temperatures in the range from 0 to 100° C., usefully at a temperature between 10 and 70° C., preferably at 20 to 60° C. After fine dispersing has taken place, the pigment preparation may be diluted further with water, preferably deionized or distilled water.

The pigment preparations of the invention are suitable for pigmenting and coloring macromolecular materials of all kinds. In particular the pigment preparations of the invention are suitable for pigmenting and producing emulsion and other paints, dispersion-based varnishes, printing inks, including for example textile, flexographic, decorative or gravure printing inks, wallpaper inks, water-thinnable varnishes, wood stains, wood preservative systems, and coatings for the surface coating of articles made, for example, of metal, wood, plastic, glass, ceramic, concrete, textile material, paper, or rubber.

A particular feature of the pigment preparations of the invention is their use as universal tinting pastes. Universal tinting pastes are suitable not only for coloring aqueous paints but also for tinting solventborne varnishes. Customary dispersants for aqueous pigment preparations stabilize the pigments only in aqueous systems, but not in solventborne systems. If aqueous pigment preparations are used for coloring solventborne varnishes, there may be agglomeration of the pigments and there may be floating of the agglomerated pigments in the varnish. On application of the varnishes by brush, roller, or by spray application, streakiness may be a result, as may also be a rough paint outcome as a result of differences in shade, because the pigments undergo flocculation in the paint and during the drying process, and so the color strength is reduced. When the colored varnishes are applied, the pigment agglomerates are separated again, but to different extents, and hence the shade differences observed come about. In the laboratory, this phenomenon is simulated in the rubout test, which is described in U.S. Pat. No. 3,840,383.

EXAMPLES

Production of a Pigment Preparation

The pigment, in the form alternatively of powder, granules, or presscake, is pasted in deionized water, together with the dispersants and the other additions, and then homogenized and subjected to preliminary dispersion, using a dissolver (e.g., from VMA-Getzmann GmbH, model AE3-M1) or other suitable apparatus.

For dispersion, the liquid components (B), (C), and (F) are introduced into a grinding vessel and mixed. Then the powder-form components (A) and optionally (D) and (E) are added, and preliminary dispersion takes place using the dissolver.

The subsequent fine dispersing takes place by means of a bead mill (e.g., the AE3-M1 from VMA-Getzmann) or else of another suitable dispersing assembly, with grinding taking place using siliquarzite beads or zirconium mixed oxide beads with a size of d=1 mm, accompanied by cooling, until the desired color strength and coloristic properties are obtained. The final pigment concentration desired is then set using deionized water, the grinding media are separated off, and the pigment preparation is isolated.

Testing of Varnish Compatibility and Color Strength

The pigment preparation is stored for a week at 60° C. and assessed visually. The viscosity of the pigment preparation is measured at 25° C. using a Haake viscometer 550 at a shear rate of $\frac{1}{60}$ sec$^{-1}$ or, in the case of highly fluid pigment preparations, using a Brookfield viscometer, model DV-II with spindle 3 at 100 rpm. For the determination of the color strength and the compatibility, the pigment preparations are added both to a white aqueous emulsion paint and to a mineral oil-containing long-oil alkyd varnish. For the testing of the color strength and compatibility, 200 g of each of the tinted paints, consisting of 92 wt % of base varnish and 8 wt % of the pigment preparation, are introduced into a metal can and homogenized for 60 seconds in an lnkshaker 500 from Olbrich Know-how, Hemer. After one day, the tinted paints are coated out onto a test card, using a 120 μm doctor blade on a film-drawing apparatus, model 509 MC, from Erichsen GmbH, Hemer. The rubout test is performed on the drying paint films in the manner described in the specification U.S. Pat. No. 3,840,383.

The pigment preparations described in the examples below were produced by the method described above, the following constituents being used in the stated amounts in such a way as to give 100 parts of each pigment preparation. In the present specification, "parts" means parts by weight and percentages are weight percentages, unless indicated otherwise in any specific case.

Example 1

60.0 parts C.I. Pigment Yellow 42 (Bayferrox Yellow 3920, Lanxess, component (A)),
4.0 parts a 38% dispersion of a sodium tallow fatty alkyl sulfosuccinamate (Emulsogen® TAS, Clariant, component (B) analogous to formula (V)),
5.0 parts oleyl ethoxylate reacted with 8 mol of ethylene oxide (Genapol® O 080, Clariant, component (C)),
6.0 parts polyethylene glycol with a molecular weight of 200 g/mol (Polyglykol 200 USP, Clariant, component (F)),
0.3 parts defoamer (D-Foam-R C 740, Clariant, component (F)),
0.2 parts preservative (Nipacide® BSM, Clariant, component (F)),
24.5 parts water (component (G))

After storage for one week at 60° C., the pigment preparation is liquid, homogeneous, and foam-free. The viscosity of the pigment preparation is 1.8 Pa·s, measured using a Haake cone/plate viscometer. The long-oil alkyd varnish and the white emulsion paint tinted with the pigment paste exhibit no rubout. After further storage at 25° C. for 4 weeks, the pigment preparation remains homogeneous and suitable for use as tinting paste.

Example 2

Comparative Example 60.0 parts C.I. Pigment Yellow 42 (Bayferrox Yellow 3920, Lanxess, component (A)),
2.0 parts oleyl ethoxylate reacted with 8 mol of ethylene oxide (Genapol® O 080, Clariant, component (C)),
1.5 parts a 40% strength ammonium polyacrylate solution (component (F)),
6.0 parts polyethylene glycol with a molecular weight of 200 g/mol (Polyglykol 200 USP, Clariant, component (F)),
0.3 parts defoamer (D-Foam-R C 740, Clariant, component (F)),
0.2 parts preservative (Nipacide® BSM, Clariant, component (F)),
32.0 parts water (component (G))

The pigment preparation after grinding is a liquid, viscous pigment dispersion. After storage for one week at 60° C., the pigment preparation becomes solid and highly thixotropic. The paste liquefies again on stirring, and has a pigment preparation viscosity of 3.80 Pa·s, measured using a Haake cone/plate viscometer. On repeated storage, the pigment preparation thickens up again. The white emulsion paint tinted with the pigment paste exhibits no rubout, whereas the long-oil alkyd varnish tinted with the pigment paste exhibits severe rubout.

Example 3

Comparative Example 65.0 parts C.I. Pigment Yellow 42 (Bayferrox Yellow 3920, Lanxess, component (A)),
8.0 parts oleyl ethoxylate reacted with 8 mol of ethylene oxide (Genapol® O 080, Clariant; component (C)),
6.0 parts a 30% strength solution of a tallow fatty alkylammonium acetate (component (F)),
10.0 parts polyethylene glycol with a molecular weight of 200 g/mol (Polyglykol 200 USP, Clariant, component (F)),
0.3 parts defoamer (D-Foam-R C 740, Clariant, component (F)), 0.2 parts preservative (Nipacide® BSM, Clariant, component (F)), 10.5 parts water (component (G))

The pigment preparation after grinding is a liquid, viscous pigment dispersion. After one week of storage at 60° C., the pigment preparation is solid. The viscosity cannot be determined and the pigment preparation is unsuitable for liquid metering as tinting paste.

Example 4

Comparative Example 65.0 parts C.I. Pigment Yellow 42 (Bayferrox Yellow 3920, Lanxess, component (A)), 8.0 parts oleyl ethoxylate reacted with 8 mol of ethylene oxide (Genapol® O 080, Clariant; component (C)), 1.0 parts tall oil fatty acid (component (F)), 6.0 parts a 30% strength solution of a tallow fatty alkylammonium acetate (component (F)), 10.0 parts polyethylene glycol with a molecular weight of 200 g/mol (Polyglykol 200 USP, Clariant, component (F)), 0.3 parts defoamer (D-Foam-R C 740, Clariant, component (F)), 0.2 parts preservative (Nipacide® BSM, Clariant, component (F)), 9.5 parts water (component (G))

The pigment preparation after grinding is a liquid, viscous dispersion. After storage for one week at 60° C., the pigment preparation is liquid and viscous and the viscosity is 4.0 Pa·s as measured with a Haake cone/plate viscometer at a shear rate of 1/60 sec$^{-1}$. The white emulsion paint tinted with the pigment preparation exhibits no rubout, whereas the long-oil alkyd varnish tinted with the pigment paste exhibits severe rubout. On further storage at 25° C. for 4 weeks, the pigment preparation thickens up and is thereafter no longer suitable for use as a tinting paste for paints and varnishes.

Example 5

50.0 parts C.I. Pigment Black 11 (Bayferrox Black 316, Lanxess, component (A)), 7.0 parts a 38% dispersion of a sodium tallow fatty alkyl sulfosuccinamate (Emulsogen® TAS, Clariant, component (B)), 8.0 parts oleyl ethoxylate reacted with 8 mol of ethylene oxide (Genapol® O 080, Clariant, component (C)), 10.0 parts polyethylene glycol with a molecular weight of 200 g/mol (Polyglykol 200 USP, Clariant, component (F)), 0.3 parts defoamer (D-Foam-R C 740, Clariant, component (F)), 0.2 parts preservative (Nipacide® BSM, Clariant, component (F)), 24.5 parts water (component (G))

After storage for one week at 60° C., the pigment preparation is liquid, homogeneous, and foam-free. The viscosity of the pigment preparation is 2.9 Pa·s, measured using a Haake cone/plate viscometer. The long-oil alkyd varnish and the white emulsion paint tinted with the pigment paste exhibit no rubout. After further storage at 25° C. for 4 weeks, the pigment preparation remains homogeneous and suitable for use as tinting paste.

Example 6

62.0 parts C.I. Pigment Red 101 (Bayferrox Red 130, Lanxess, component (A)), 2.5 parts a 38% dispersion of a sodium tallow fatty alkyl sulfosuccinamate (Emulsogen® TAS, Clariant, component (B)), 3.5 parts oleyl ethoxylate reacted with 8 mol of ethylene oxide (Genapol® O 080, Clariant, component (C)), 4.0 parts polyethylene glycol with a molecular weight of 300 g/mol (Polyglykol, Clariant, component (F)), 0.3 parts defoamer (D-Foam-R C 740, Clariant, component (F)), 0.2 parts preservative (Nipacide® BSM, Clariant, component (F)), 27.5 parts water (component (G))

After storage for one week at 60° C., the pigment preparation is liquid, homogeneous, and foam-free. The viscosity of the pigment preparation is 0.92 Pa·s, measured using a Haake cone/plate viscometer. The long-oil alkyd varnish and the white emulsion paint tinted with the pigment paste exhibit no rubout. After further storage at 25° C. for 4 weeks, the pigment preparation remains homogeneous and suitable for use as tinting paste.

Example 7

57.0 parts C.I. Pigment Green 17 (Chrome Oxide Green GN, Lanxess, component (A)), 5.0 parts a 38% dispersion of a sodium tallow fatty alkyl sulfosuccinamate (Emulsogen® TAS, Clariant, component (B)), 7.0 parts oleyl ethoxylate reacted with 8 mol of ethylene oxide (Genapol® O 080, Clariant, component (C)), 8.0 parts polyethylene glycol with a molecular weight of 300 g/mol (Polyglykol, Clariant, component (F)), 0.3 parts defoamer (D-Foam-R C 740, Clariant, component (F)), 0.2 parts preservative (Nipacide® BSM, Clariant, component (F)), 22.5 parts water (component (G))

After storage for one week at 60° C., the pigment preparation is liquid, homogeneous, and foam-free. The viscosity of the pigment preparation is 1.02 Pa·s, measured using a Haake cone/plate viscometer. The long-oil alkyd varnish and the white emulsion paint tinted with the pigment paste exhibit no rubout. After further storage at 25° C. for 4 weeks, the pigment preparation has separated into 2 phases, but can be homogenized by stirring or shaking and thereafter is suitable for use as tinting paste.

Example 8

50.0 parts C.I. Pigment Black 11 (Bayferrox Black 316, Lanxess, component (A)), 7.0 parts a 38% dispersion of a sodium tallow fatty alkyl sulfosuccinamate (Emulsogen® TAS, Clariant, component (B)), 8.0 parts tall oil fatty acid ethanolamide reacted with 5 mol of ethylene oxide (Emulsogen® MT 050, Clariant, component (C)), 10.0 parts glycerol ethoxylate with a molecular weight of 300 g/mol (Polyglykol 300, Clariant, component (F)), 0.3 parts defoamer (D-Foam-R C 740, Clariant, component (F)), 0.2 parts preservative (Nipacide® BSM, Clariant, component (F)), 24.5 parts water (component (G))

After storage for one week at 60° C., the pigment preparation is liquid, homogeneous, and foam-free. The viscosity of the pigment preparation is 1.3 Pa·s, measured using a Haake cone/plate viscometer. The long-oil alkyd varnish and the white emulsion paint tinted with the pigment paste exhibit no rubout. After further storage at 25° C. for 4 weeks, the pigment preparation remains homogeneous and suitable for use as tinting paste.

Example 9

50.0 parts C.I. Pigment Black 11 (Bayferrox Black 316, Lanxess, component (A)),
7.0 parts a 38% dispersion of a sodium tallow fatty alkyl sulfosuccinamate (Emulsogen® TAS, Clariant, component (B)),
8.0 parts tall oil fatty acid ethanolamide reacted with 10 mol of ethylene oxide (component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
24.5 parts water (component (G))

After storage for one week at 60° C., the pigment preparation is liquid, homogeneous, and foam-free. The viscosity of the pigment preparation is 0.5 Pa·s, measured using a Haake cone/plate viscometer. The long-oil alkyd varnish and the white emulsion paint tinted with the pigment paste exhibit no rubout. After further storage at 25° C. for 4 weeks, the pigment preparation has separated into 2 phases, but can be homogenized by stirring or shaking and thereafter is suitable for use as tinting paste.

Example 10

50.0 parts C.I. Pigment Black 11 (Bayferrox Black 316, Lanxess, component (A)),
7.0 parts a 38% dispersion of a sodium tallow fatty alkyl sulfosuccinamate (Emulsogen® TAS, Clariant, component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
24.5 parts water (component (G))

After storage for one week at 60° C., the pigment preparation is liquid, homogeneous, and foam-free. The viscosity of the pigment preparation is 0.22 Pa·s, measured using a Haake cone/plate viscometer. The long-oil alkyd varnish and the white emulsion paint tinted with the pigment paste exhibit no rubout. After further storage at 25° C. for 4 weeks, the pigment preparation has separated into 2 phases, but can be homogenized by stirring or shaking and thereafter is suitable for use as tinting paste.

Example 11

50.0 parts C.I. Pigment Black 11 (Bayferrox Black 316, Lanxess, component (A)),
7.0 parts a 38% dispersion of a sodium tallow fatty alkyl sulfosuccinamate (Emulsogen® TAS, Clariant, component (B)),
8.0 parts tall oil fatty acid ethanolamide reacted with 30 mol of ethylene oxide (component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
24.5 parts water (component (G))

After storage for one week at 60° C., the pigment preparation is liquid, homogeneous, and foam-free. The viscosity of the pigment preparation is 0.24 Pa·s, measured using a Haake cone/plate viscometer. The long-oil alkyd varnish and the white emulsion paint tinted with the pigment paste exhibit no rubout. After further storage at 25° C. for 4 weeks, the pigment preparation has separated into 2 phases, but can be homogenized by stirring or shaking and thereafter is suitable for use as tinting paste.

Example 12

60.0 parts C.I. Pigment Black 11 (Bayferrox Black 316, Lanxess, component (A)),
7.0 parts a 38% dispersion of a sodium tallow fatty alkyl sulfosuccinamate (Emulsogen® TAS, Clariant, component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
14.5 parts water (component (G))

After storage for one week at 60° C., the pigment preparation is liquid, homogeneous, and foam-free. The viscosity of the pigment preparation is 1.17 Pa's, measured using a Haake cone/plate viscometer. The long-oil alkyd varnish and the white emulsion paint tinted with the pigment paste exhibit no rubout. After further storage at 25° C. for 4 weeks, the pigment preparation remains homogeneous and suitable for use as tinting paste.

Example 13

60.0 parts C.I. Pigment Blue 28 (Heucodur Blue 551, Heubach, component (A)),
7.0 parts a 38% dispersion of a sodium tallow fatty alkyl sulfosuccinamate (Emulsogen® TAS, Clariant, component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
14.5 parts water (component (G))

After storage for one week at 60° C., the pigment preparation is liquid, homogeneous, and foam-free. The viscosity of the pigment preparation is 0.64 Pa·s, measured using a Haake cone/plate viscometer. The long-oil alkyd varnish and the white emulsion paint tinted with the pigment paste exhibit no rubout. After further storage at 25° C. for 4 weeks, the pigment preparation has separated into 2 phases, but can be homogenized by stirring or shaking and thereafter is suitable for use as tinting paste.

Example 14

60.0 parts C.I. Pigment Yellow 42 (Bayferrox Yellow 3920, Lanxess, component (A)),
7.0 parts a 38% dispersion of a sodium tallow fatty alkyl sulfosuccinamate (Emulsogen® TAS, Clariant, component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
14.5 parts water (component (G))

After storage for one week at 60° C., the pigment preparation is liquid, homogeneous, and foam-free. The viscosity of the pigment preparation is 1.19 Pa·s, measured using a Haake cone/plate viscometer. The long-oil alkyd varnish and the white emulsion paint tinted with the pigment paste exhibit no rubout. After further storage at 25° C. for 4 weeks, the pigment preparation remains homogeneous and suitable for use as tinting paste.

Example 15

60.0 parts C.I. Pigment Black 11 (Bayferrox Black 316, Lanxess, component (A)),
2.5 parts a sodium isodecyl sulfosuccinic monoester (component (B) analogous to formula (IV)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
19.0 parts water (component (G))

After storage for one week at 60° C., the pigment preparation is liquid, homogeneous, and foam-free. The viscosity of the pigment preparation is 0.22 Pa·s, measured using a Haake cone/plate viscometer. The long-oil alkyd varnish and the white emulsion paint tinted with the pigment paste exhibit no rubout. After further storage at 25° C. for 4 weeks, the pigment preparation has separated into 2 phases, but can be homogenized by stirring or shaking and thereafter is suitable for use as tinting paste.

Example 16

50.0 parts C.I. Pigment Black 11 (Bayferrox Black 316, Lanxess, component (A)),
7.0 parts a 38% strength solution of a tetrasodium N-(1,2-dicarboxyethyl)-N-octadecylsulfosuccinamate (Aerosol 22, Cytec, component (B) analogous to formula (VI)),
8.0 parts tall oil fatty acid ethanolamide reacted with 5 mol of ethylene oxide (Emulsogen® MT 050, Clariant, component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
24.5 parts water (component (G))

After storage for one week at 60° C., the pigment preparation is liquid, homogeneous, and foam-free. The viscosity of the pigment preparation is 0.81 Pa·s, measured using a Haake cone/plate viscometer. The long-oil alkyd varnish and the white emulsion paint tinted with the pigment paste exhibit no rubout. After further storage at 25° C. for 4 weeks, the pigment preparation has separated into 2 phases, but can be homogenized by stirring or shaking and thereafter is suitable for use as tinting paste.

Example 17

21.0 parts C.I. Pigment Blue 15:3 (Hostaperm® Blue B2G, Clariant, component (A)),
3.8 parts a 38% dispersion of a sodium tallow fatty alkyl sulfosuccinamate (Emulsogen® TAS, Clariant, component (B)),
5.2 parts oleyl ethoxylate reacted with 8 mol of ethylene oxide (Genapol® O 080, Clariant, component (C)),
3.0 parts montmorillonite clay mineral thickener and antisettling agent (Ceratofix® VP, Clariant, component (D)),
18.0 parts barium sulfate (Blanc Fixe micro, Rockwood Pigments, component (E)),
6.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
42.5 parts water (component (G))

After storage for one week at 60° C., the pigment preparation is liquid, homogeneous, and foam-free. The viscosity of the pigment preparation is 175 mPa·s, measured using a Brookfield viscometer by means of spindle 3 at 100 rpm. The long-oil alkyd varnish and the white emulsion paint tinted with the pigment paste exhibit no rubout. After further storage at 25° C. for 4 weeks, the pigment preparation remains homogeneous and suitable for use as tinting paste.

Example 18

5.0 parts C.I. Pigment Black 7 (Special Black 4, Evonik, component (A)),
3.8 parts a 38% dispersion of a sodium tallow fatty alkyl sulfosuccinamate (Emulsogen® TAS, Clariant, component (B)),
5.2 parts oleyl ethoxylate reacted with 8 mol of ethylene oxide (Genapol® O 080, Clariant, component (C)),
2.0 parts montmorillonite clay mineral thickener and antisettling agent (Ceratofix® VP, Clariant, component (D)),
26.0 parts barium sulfate (Blanc Fixe micro, Rockwood Pigments, component (E)),
6.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
52.5 parts water (component (G))

After storage for one week at 60° C., the pigment preparation is liquid, homogeneous, and foam-free. The viscosity of the pigment preparation is 162 mPa·s, measured using a Brookfield viscometer by means of spindle 3 at 100 rpm. The long-oil alkyd varnish and the white emulsion paint tinted with the pigment paste exhibit no rubout. After further storage at 25° C. for 4 weeks, the pigment preparation remains homogeneous and suitable for use as tinting paste.

Example 19

2.0 parts C.I. Pigment Violet 23 (Hostaperm® Violet RL 02, Clariant, component (A)),
7.0 parts a 38% strength solution of a tetrasodium N-(1,2-dicarboxyethyl)-N-octadecylsulfosuccinamate (Aerosol 22, Cytec, component (B) analogous to formula (VI)),
6.0 parts tall oil fatty acid ethanolamide reacted with 15 mol of ethylene oxide (Dispersogen® MT 150, Clariant, component (C)),
3.0 parts montmorillonite clay mineral thickener and antisettling agent (Ceratofix® VP, Clariant, component (D)),
29.0 parts barium sulfate (Blanc Fixe micro, Rockwood Pigments, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
42.5 parts water (component (G))

After storage for one week at 60° C., the pigment preparation is liquid, homogeneous, and foam-free. The viscosity of the pigment preparation is 82 mPa·s, measured using a Brookfield viscometer by means of spindle 3 at 100 rpm. The long-oil alkyd varnish and the white emulsion paint tinted with the pigment paste exhibit no rubout. After further storage at 25° C. for 4 weeks, the pigment preparation remains homogeneous and suitable for use as tinting paste.

Example 20

13.0 parts C.I. Pigment Red 112 (Permanent® Red FGR, Clariant, component (A)),
4.0 parts a 38% dispersion of a sodium tallow fatty alkyl sulfosuccinamate (Emulsogen® TAS, Clariant, component (B)),
6.0 parts tall oil fatty acid ethanolamide reacted with 15 mol of ethylene oxide (Dispersogen® MT 150, Clariant, component (C)),
3.0 parts montmorillonite clay mineral thickener and antisettling agent (Ceratofix® VP, Clariant, component (D)),
25.0 parts barium sulfate (Blanc Fixe micro, Rockwood Pigments, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
38.5 parts water (component (G))

After storage for one week at 60° C., the pigment preparation is liquid, homogeneous, and foam-free. The viscosity of the pigment preparation is 183 mPa·s, measured using a Brookfield viscometer by means of spindle 3 at 100 rpm. The long-oil alkyd varnish and the white emulsion paint tinted with the pigment paste exhibit no rubout. After further storage at 25° C. for 4 weeks, the pigment preparation remains homogeneous and suitable for use as tinting paste.

Example 21
Comparative Example 50.0 parts C.I. Pigment Black 11 (Bayferrox Black 316, Lanxess, component (A)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
31.5 parts water (component (G))

After storage for one week at 60° C., the pigment preparation is liquid, homogeneous, and foam-free. The viscosity of the pigment preparation is 0.38 Pa·s, measured using a Haake cone/plate viscometer at a shear rate of $\frac{1}{60}$ sec$^{-1}$. The white emulsion paint tinted with the pigment paste exhibits no rubout, whereas the long-oil alkyd varnish tinted with the pigment paste exhibits severe rubout. After further storage at 25° C. for 4 weeks, the pigment preparation remains homogeneous and suitable for use as tinting paste for aqueous varnishes.

Example 22
Comparative Example 50.0 parts C.I. Pigment Yellow 3920 (Bayferrox Yellow 3920, Lanxess, component (A)),
8.0 parts oleyl ethoxylate reacted with 8 mol of ethylene oxide (Genapol® O 080, Clariant, component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
31.5 parts water (component (G))

After storage at 60° C. for a week, the pigment preparation is pasty and highly viscous and cannot be metered as a tinting paste. The viscosity of the pigment preparation is outside the measuring range of the usual measuring devices and cannot be determined.

The above comparative examples show the significance of the inventive combination of components B and C. Pigment preparations with suitable viscosity can be produced with the inventive combination of components B and C, but not with B alone. The pigment preparations of the invention which comprise components B and C largely exhibit good compatibility and no rubout on tinting of aqueous and solventborne paints and varnishes.

What is claimed is:
1. An aqueous, binder-free pigment preparation comprising
(A) 1.0 to 75.0 wt % of at least one organic or inorganic white or chromatic pigment or a mixture of different organic and inorganic white or chromatic pigments,
(B) 0.01 to 8.0 wt % of at least one compound of the formula (I),

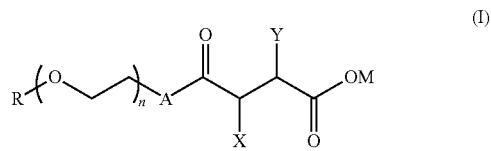

in which

R is a saturated or unsaturated, linear or branched, aliphatic or alicyclic hydrocarbon radical having 6 to 18 carbon atoms, n is an integer from 0 to 10, A is an oxygen atom or a difunctional group of the formula (II)

(II)

B is a hydrogen atom or a group of the formula (III),

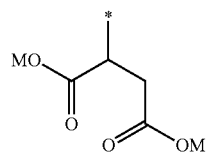

(III)

whose bonding is via the valence marked with *,

X and Y are selected from the group consisting of sulfonic acid groups in acidic form, their respective sodium, potassium, and ammonium salt and hydrogen atoms; wherein if X is a sulfonic acid group or salt thereof, Y is a hydrogen atom, and, conversely, if X is a hydrogen atom, Y is a sulfonic acid group or salt thereof, and M is a hydrogen atom or a sodium, potassium, or ammonium ion, and, if B is a functional group of the formula (III), n is 0 and M is a sodium atom, (C) 0.01 to 12.0 wt % of a nonionic surfactant which is a fatty acid ethanolamide ethoxylate of the formula (VII),

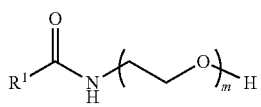

(VII)

in which m is an integer from 3 to 50 and $R^1$ is $C_7$ to $C_{21}$ alkyl or alkenyl, and (G) water.

2. The aqueous, binder-free pigment preparation as claimed in claim 1, wherein R is an alkyl or alkenyl radical.

3. The aqueous, binder-free pigment preparation as claimed in claim 1, wherein component (B) is a sulfosuccinic monoester of the formula (IV),

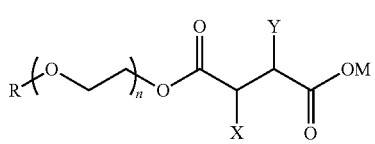

(IV)

in which

R, n, X, Y, and M have the definitions indicated in claim 1.

4. The aqueous, binder-free pigment preparation as claimed in claim 1, wherein component (B) is an alkyl sulfosuccinamate of the formula (V),

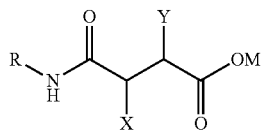

(V)

in which

R, X, Y, and M have the definitions indicated in claim 1.

5. The aqueous, binder-free pigment preparation as claimed in claim 1, wherein component (B) is a sulfosuccinamide of the formula (VI),

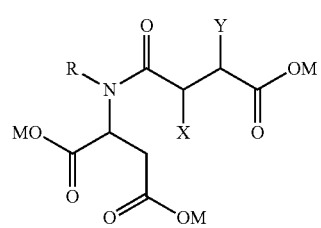

(VI)

in which

R, X, Y, and M have the definitions indicated in claim 1.

6. The aqueous, binder-free pigment preparation as claimed in claim 1, containing 1 to 12 wt % of a fatty acid alkanolamide ethoxylate of the formula (VII).

7. The aqueous, binder-free pigment preparation as claimed in claim 1, containing 1 to 8 wt % of a compound of the formula (I).

8. The aqueous, binder-free pigment preparation as claimed in claim 1, containing 10 to 75 wt % of water.

9. The aqueous, binder-free pigment preparation as claimed in claim 1, having a viscosity of 10 to 10 000 mPas as determined using a cone/plate viscometer at a shear rate of 1/60 sec−1.

10. The aqueous, binder-free pigment preparation as claimed in claim 1, further comprising (D) 0-8.0 wt % of clay mineral thickeners based on natural or alkali-activated montmorillonite phyllosilicate minerals.

11. The aqueous, binder-free pigment preparation as claimed in claim 1, further comprising (E) 0-20.0 wt % of inorganic fillers.

12. The aqueous, binder-free pigment preparation as claimed in claim 1, further comprising (F) 0 to 30 wt % of further auxiliaries customary for the production of aqueous, binder-free pigment preparations, selected from wetting agents, humectants, solvents, defoamers, rheological additives, preservatives, buffer substances, and pH regulators.

13. The aqueous, binder-free pigment preparation as claimed in claim 12, containing up to 15 wt % of at least one humectant or solvent selected from the group consisting of glycol ethers with a 200 to 20 000 g/mol number-average molecular weight.

14. The aqueous, binder-free pigment preparation as claimed in claim 12, containing up to 2 wt % of defoamers.

15. The aqueous, binder-free pigment preparation as claimed in claim 12, containing up to 1 wt % of an in-can preservative.

16. A process for coloring a macromolecular material, coating material, paint and ink, comprising the step of adding at least one aqueous, binder-free pigment preparation comprising
(A) 1.0 to 75.0 wt % of at least one organic or inorganic white or chromatic pigment or a mixture of different organic and inorganic white or chromatic pigments,
(B) 0.01 to 8.0 wt % of at least one compound of the formula (I),

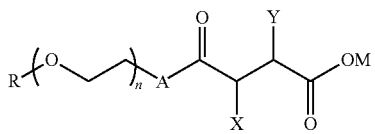
(I)

in which
R is a saturated or unsaturated, linear or branched, aliphatic or alicyclic hydrocarbon radical having 6 to 18 carbon atoms,
n is an integer from 0 to 10,
A is an oxygen atom or a difunctional group of the formula (II)

(II)

B is a hydrogen atom or a group of the formula (III),

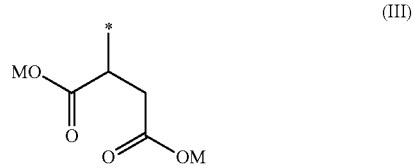
(III)

whose bonding is via the valence marked with *,
X and Y are selected from the group consisting of sulfonic acid groups in acidic form, their respective sodium, potassium, and ammonium salt and hydrogen atoms; wherein if X is a sulfonic acid group or salt thereof, Y is a hydrogen atom, and, conversely, if X is a hydrogen atom, Y is a sulfonic acid group or salt thereof, and
M is a hydrogen atom or a sodium, potassium, or ammonium ion,
and, if B is a functional group of the formula (III), n is 0 and M is a sodium atom,
(C) 0.01 to 12.0 wt % of a nonionic surfactant which is a fatty acid ethanolamide ethoxylate of the formula (VII),

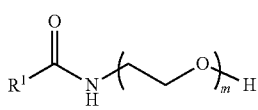
(VII)

in which m is an integer from 3 to 50 and $R^1$ is $C_7$ to $C_{21}$ alkyl or alkenyl, and
(G) water to the macromolecular material, coating material, paint or ink.

17. A macromolecular material, coating material, paint or ink, comprising at least one aqueous, binder-free pigment preparation as claimed in claim 1.

18. A process for printing a two-dimensional sheet structure comprising the step of contacting the two-dimensional sheet structure with at least one macromolecular material, coating material, paint or ink, as claimed in claim 17.

* * * * *